Sept. 29, 1925.
V. G. VAUGHAN
RADIANT ELECTRIC HEATER
Filed May 19, 1923
1,555,333
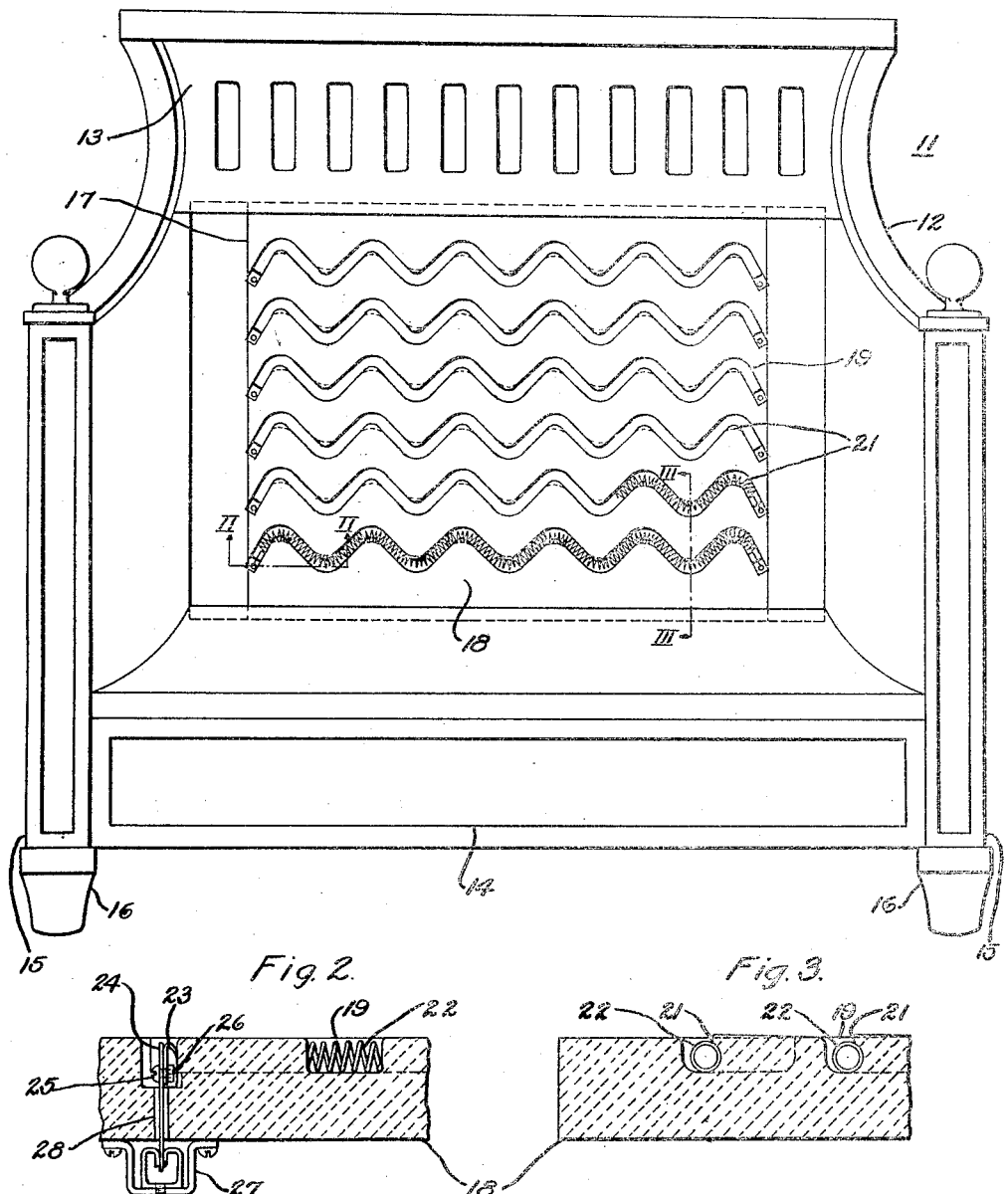
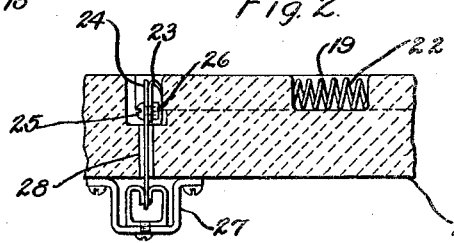
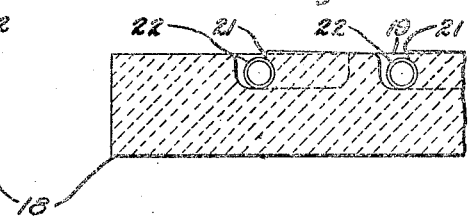
WITNESSES:
INVENTOR
Victor G. Vaughan.
BY
ATTORNEY Patented Sept. 29, 1925.

1,555,333

UNITED STATES PATENT OFFICE.

VICTOR G. VAUGHAN, OF WILKINSBURG, PENNSYLVANIA, ASSIGNOR TO WESTINGHOUSE ELECTRIC & MANUFACTURING COMPANY, A CORPORATION OF PENNSYLVANIA.

RADIANT ELECTRIC HEATER.

Application filed May 19, 1923. Serial No. 640,054.

*To all whom it may concern:*

Be it known that I, VICTOR G. VAUGHAN, a citizen of the United States, and a resident of Wilkinsburg, in the county of Allegheny and State of Pennsylvania, have invented a new and useful Improvement in Radiant Electric Heaters, of which the following is a specification.

My invention relates to electrical heating devices and particularly to electric air heaters.

One object of my invention is to provide an electric air heater that shall be of relatively large capacity and that shall comprise relatively few parts.

Another object of my invention is to provide an electric air heater that shall comprise a grooved refractory plate for supporting a plurality of individual resistor members.

Another object of my invention is to provide an electric air heater that shall comprise a plurality of radiant heating units.

Another object of my invention is to provide an electric air heater that shall permit of easily and quickly inserting a heating unit in, and removing it from, its operative position therein.

In practicing my invention, I provide a casing having a front opening therein and a plate of refractory electric-insulating material located in said casing in said front opening. The plate is provided in its front surface with a plurality of zigzag grooves, the projecting corners of which are undercut. Helically wound resistor members are located in said grooves, their ends being connected to terminal pins that extend through lateral openings in the plate at the ends of said grooves and engage resilient contact jaws mounted on the back of the plate.

In the single sheet of drawings,

Figure 1 is a view, in front elevation, of an electric air heater comprising the device embodying my invention.

Fig. 2 is a partial sectional view therethrough, taken on the line II—II of Fig. 1 and Fig. 3 is a partial sectional view therethrough, taken on the line III—III of Fig. 1.

An electric air heater 11 comprises a metal casing 12 that may be built up in any suitable or desired manner, either by the use of sheet metal members or by the use of metal castings. The casing is here illustrated in front elevation only, as it forms no particular part of my invention, and is shown for illustrative purposes only, as comprising a back wall 13, a front panel 14, side columns 15 and a plurality of supporting members 16.

The main object of the casing is to provide a housing for the heating element to be hereinafter described in detail, and to that end it should be of ornamental and pleasing form and outline.

The casing 12 is provided with a front opening 17, within which is located a plate 18 of a suitable refractory electric-insulating material. Any suitable or desired means may be provided in the casing 12 to permit of easily and quickly introducing the plate into its proper operative position in the casing and of removing it therefrom whenever required. To this end, a rear panel of the casing 12 may be made removable and any suitable means may be provided within the casing for supporting the plate 18 in its proper operative position therein.

The plate 18 is provided with a plurality of zigzag grooves 19 that extend in a substantially horizontal direction across the front surface thereof. The individual portions of the grooves 19 that extend angularly relatively to each other are located parallel to the corresponding portions of the adjacent grooves substantially as illustrated in Fig. 1 of the drawing. Each of the return-bent portions of the grooves 19 are provided at their salient points with a small overhanging portion or flange 21 that is effective to secure and hold a resilient, helically-wound, resistor member 22 in the grooves 19.

The adjacent turns of the helical resistor member 22 are wound close together and are slightly pulled apart when the resistor member is placed in the groove 19, whereby the individual portions of the resistor member are forced to lie underneath the overhanging flanges 21 to the end that the individual heating units may be securely held in their proper operative positions within the zigzag grooves 19. Each of the two ends 23 of the resistor members 22 is secured by any suitable or desired means to terminal pins 24. While I have illustrated a machine screw 25 and nut 26 as the means for connecting the pins 24 to the respective ends 23, I may weld the two ends together.

Resilient contact-jaw members 27 are suitably secured to the rear surface of the plate 18 opposite the ends of the grooves 19, laterally extending openings 28 being provided in the plate 18 at the ends of each of the gooves 19 to permit of the terminal pins 24 extending through the plate to operatively engage the contact pins 27. This construction provides means for holding the terminal pins and the ends of the respective heating units 22 in their proper operative positions, and also permits of suitably energizing the respective heating units, as the contact jaws 27 may be connected to a suitable source of electric energy (not shown).

A preferred method of selectively energizing a plurality of individual heating units is more particularly disclosed and claimed in my co-pending application, Serial No. 641,054 filed May 24, 1923 and assigned to the Westinghouse Electric & Manufacturing Company, (Case 10,399). In that application, I have described in detail and claimed a control system for permitting of selectively energizing a plurality of individual heating units to simulate closely the action of a gas radiant heater when the supply of gas is permitted to be increased and I may employ such a system of control with this heater or I may connect all of the respective contact jaws 27 located at either end of the plate 18 together and control the energization of the heating elements as a group.

The individual heating units 22 may be easily and quickly inserted in and removed from their proper operative positions in the respective groups 19 and when they are placed in their proper operative positions therein, they are ready to be energized without the necessity of connecting their ends to suitable terminals.

Various modifications and changes may be made without departing from the spirit and scope of the invention, and I desire, therefore, that only such limitations shall be placed thereon as are imposed by the prior art or are set forth in the appended claims.

I claim as my invention:

1. An electric heater comprising a refractory plate having a plurality of spaced grooves extending in zigzag shape across one face of said plate, integral overhanging portions being provided at said grooves adjacent the return-bent portions thereof, and resistor members located in said grooves and retained therein by said overhanging portions.

2. An electric air heater comprising a casing having an open front portion, a refractory electric-insulating plate in said casing at said open front, said plate having a plurality of grooves in its outer face, each groove comprising a plurality of alternately oppositely extending return-bent portions, each return-bent portion having an overhanging flange at its salient point, and helically-wound resistor members located in said grooves and held therein by said overhanging flanges.

3. An electric heater comprising a plate of refractory electric-insulating material having a plurality of spaced zigzag grooves in one face thereof, a resilient contact jaw secured to the rear surface thereof, a resistor member located in said grooves on the front of said plate, and a terminal pin secured to the end of said resistor member, extending through said plate and operatively engaging said contact jaw.

4. An electric heater comprising a plate of refractory electric-insulating material having a plurality of zigzag grooves in its front surface, and lateral openings therethrough communicating with one end of each of said grooves, resilient contact jaws secured to the rear surface of said plate over said opening, resistor members located in said grooves and a terminal pin secured to the end of each of said resistors and projecting through said openings to engage said contact jaws.

In testimony whereof, I have hereunto subscribed my name this 15th day of May, 1923.

VICTOR G. VAUGHAN.